US012586153B2

(12) United States Patent
Swami et al.

(10) Patent No.: US 12,586,153 B2
(45) Date of Patent: Mar. 24, 2026

(54) METHODS OF BATCH-BASED DNN PROCESSING FOR EFFICIENT ANALYTICS

(71) Applicant: TEXAS INSTRUMENTS INCORPORATED, Dallas, TX (US)

(72) Inventors: Pramod Swami, Bangalore (IN); Anshu Jain, Bangalore (IN); Eppa Praveen Reddy, Telangana (IN); Kumar Desappan, Bengaluru (IN); Soyeb Nagori, Bangalore (IN); Arthur Redfern, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 454 days.

(21) Appl. No.: 18/175,185

(22) Filed: Feb. 27, 2023

(65) Prior Publication Data

US 2024/0046413 A1     Feb. 8, 2024

Related U.S. Application Data

(60) Provisional application No. 63/370,236, filed on Aug. 3, 2022.

(51) Int. Cl.
G06T 3/4046 (2024.01)

(52) U.S. Cl.
CPC .................................. G06T 3/4046 (2013.01)

(58) Field of Classification Search
CPC .............................. G06T 3/4046; H04N 19/33
See application file for complete search history.

(56) References Cited

U.S. PATENT DOCUMENTS

| | | |
|---|---|---|
| 11,231,929 B2 | 1/2022 | Tran et al. |
| 11,392,316 B2 | 7/2022 | Anderson et al. |

OTHER PUBLICATIONS

ImageMagic—ch Cutting and Bordering (Year: 2021).*
ImageMagic—ch Montage (Year: 2021).*
Lecture 17: Convolutional Neural Networks (Year: 2021).*

* cited by examiner

*Primary Examiner* — Mark Roz
(74) *Attorney, Agent, or Firm* — Carl G. Peterson; Frank D. Cimino

(57) ABSTRACT

Technology is disclosed herein to execute an inference model by a processor which includes a reshape layer. In an implementation, the reshape layer of the inference model receives an output produced by a previous layer of the inference model and inserts padding into the output, then supplies the padded output as an input to a next layer of the inference model. In an implementation, the inference model includes a stitching layer at the beginning of the inference model and an un-stitch layer at the end of the model. The stitching layer of the inference model stitches together multiple input images into an image batch and supplies the image batch as an input to a subsequent layer. The un-stitch layer receives output from a penultimate layer of the inference model and unstitches the output to produce multiple output images corresponding to the multiple input images.

20 Claims, 13 Drawing Sheets

200

205 — RECEIVE, BY A RESHAPE LAYER, AN OUTPUT PRODUCED BY A PREVIOUS LAYER OF AN INFERENCE MODEL

210 — INSERT, AT THE RESHAPE LAYER, PADDING INTO THE OUTPUT RESULTING IN A PADDED OUTPUT

215 — SUPPLY, BY THE RESHAPE LAYER, THE PADDED OUTPUT AS INPUT TO A NEXT LAYER OF THE INFERENCE MODEL

| NETWORK (SPATIAL RESOLUTION) | THROUGHPUT (FRAMES/SEC) | | PERFORMANCE IMPROVEMENT | DDR BW SAVING |
| --- | --- | --- | --- | --- |
| | PRIOR ART (SINGLE BATCH) | BATCH SIZE = 4 | | |
| EFFICIENT Net Lite0 (224x224) | 412 | 716 | 74% | 22% |
| EFFICIENT Net Lite4 (300x300) | 122 | 172 | 41% | 10% |
| Regnetx800 (224x224) | 294 | 559 | 90% | 58% |
| mobilenetV1 (224x224) | 735 | 1136 | 55% | 26% |
| mobilenetV2 (224x224) | 524 | 899 | 72% | 31% |
| inceptionNetV1 (300x300) | 446 | 649 | 45% | 32% |
| resnet18V1 (224x224) | 461 | 717 | 56% | 66% |

METHODS OF BATCH-BASED DNN PROCESSING FOR EFFICIENT ANALYTICS

CROSS-REFERENCE TO RELATED APPLICATION

The present application claims priority to U.S. Provisional Patent Application no. 63/370,236 entitled "METHODS OF BATCH BASED DNN PROCESSING FOR EFFICIENT ANALYTICS" filed on Aug. 3, 2022 which is hereby incorporated herein by reference in its entirety.

TECHNICAL FIELD

Aspects of the disclosure relate to the field of deep neural network-based image processing methods.

BACKGROUND

Deep neural networks (DNNs) and convolutional neural networks (CNNs) in particular are trained to perform computer vision tasks such as image classification, object detection, and image segmentation. Use cases involving trained DNN models include facial expression or emotion detection, eye tracking and gaze estimation for vehicle operator monitoring systems, or collision avoidance systems for drones or autonomous vehicles or for Advanced Driver Assistance Systems (ADAS). Mission-critical use cases such as collision avoidance or autonomous driving rely on rapid as well as accurate image processing by trained DNN models.

For faster image processing by trained DNN models, specialized vector and matrix accelerators are designed with very wide vector or matrix processing width, such as a Single Instruction, Multiple Data (SIMD) processor architecture. However, these accelerated processors are not fully utilized when they are used to process individual images, particularly images with small pixel datasets. Moreover, the kernels or weights of the trained DNN models cannot be stored in processor chip memory due to limited availability of device memory. These parameters are typically read from memory for each input. Accessing the parameters from off-device memory causes higher latency and under-utilization of the available DNN processor or accelerator's capability. In addition, with each input image, any initial processing that must be performed before the execution of the DNN processor generates processing overhead that becomes significant relative to the actual DNN processing of the image. The accumulated overhead results in poor utilization of the processor.

TECHNICAL OVERVIEW

Technology, including systems, methods, and devices, is disclosed herein to execute an inference model executed by a processor which includes a reshape layer. In an implementation, the reshape layer of the inference model receives an output produced by a previous layer of the inference model. The reshape layer inserts padding into the output, resulting in padded output, and supplies the padded output as an input to a next layer of the inference model.

In some implementations, the inference model executed by the processor also includes a stitching layer at the beginning of the model and an un-stitch layer at the end of the model, with other layers positioned between the stitching layer and the un-stitch layer, including the previous layer, the reshape layer, and the next layer. In some implementations, the stitching layer of the inference model stitches together multiple input images into an image batch and supplies the image batch as an input to a subsequent layer. In some implementations, the un-stitch layer receives output from a penultimate layer of the inference model and unstitches the output to produce multiple output images corresponding to the multiple input images.

In some implementations, to insert padding into the output, the processor inserts zero values around at least a portion of each of the multiple images in the image batch, where the previous layer comprises a convolutional layer and the next layer comprises another convolutional layer.

BRIEF DESCRIPTION OF THE DRAWINGS

FIG. 5 illustrates a representation of image pixel data associated with batch-based DNN processing in an implementation.

FIG. 12 illustrates a comparative analysis of batch-based DNN processing in an implementation.

DETAILED DESCRIPTION

Figure 1:
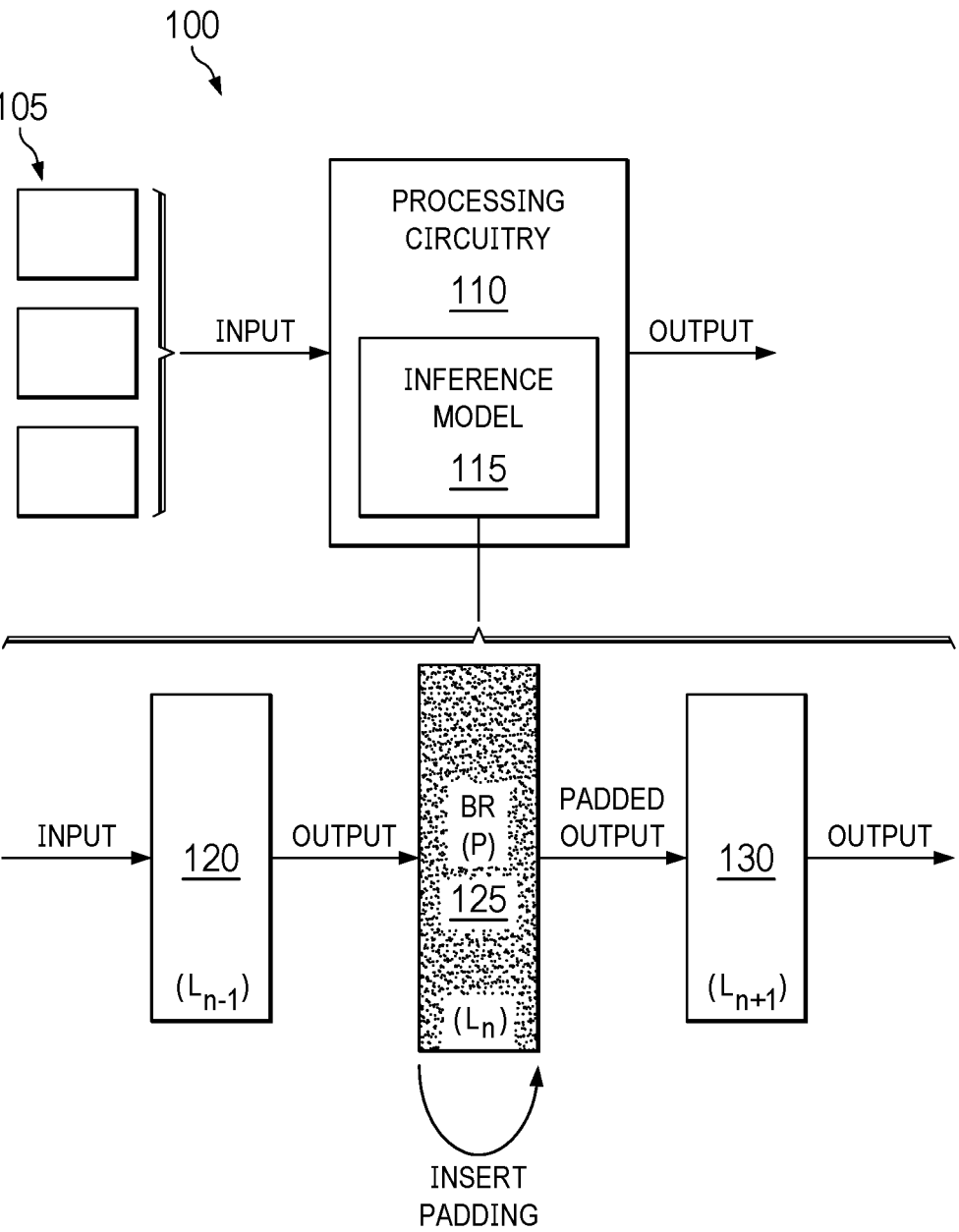
FIG. 1 illustrates an operational environment for batch-based DNN image processing in an implementation.

Systems, methods, and devices are disclosed herein to process a batch of one or more images using a modified DNN-based inference model. In an implementation, processing circuitry executing the modified DNN-based inference model receives a batch of input images for processing. The multiple processing layers of the inference model include a stitching layer, an un-stitching layer, and one or more batch reshape layers.

The stitching layer of the inference model stitches together the input images of the batch at the onset of processing. The inference model may configure the batch by horizontally stacking the images, vertically stacking the images, or in a configuration combining horizontal and vertical stacking.

During the processing, a batch reshape layer of the inference model receives output from a previous layer and pads the output by adding zero values or pixels with zero values to increase the spatial dimensions of the images of the output. The amount of padding added may be determined according to an earlier downsizing operation, in anticipation of an upcoming downsizing operation, or both. The padding operation may restore the padding around the downsized images of the image batch to its original dimensions (e.g., original thickness) or to greater dimensions (e.g., greater thickness), for example, if the images are subject to further downsizing. In an implementation, padding that is inserted between two images augments the dimensions of both images, which is to say the padding is effectively shared by the two images as each image is processed, thus minimizing the amount of padding inserted. The batch reshape layer then sends the padded output to the next layer for further processing.

In an implementation, to pad the output, the batch reshape layer inserts zero pixels (that is to say, zero values or pixels with values of zero) along the top, bottom, and left edges of each image of the output, plus an additional pixel is added at the right end of the bottom row of zero pixels. For example, an image batch of three images may be received by the batch reshape layer as an 8-pixel×24-pixel array. The inference model may determine that padding of 1-pixel pad width is to be added to the image batch by the batch reshape layer. Padding the 8×24 pixel array results in an array of 10 rows, where the top 9 rows are 27 pixels wide and the 10th row of the pixel array is 28 pixels wide, and where the first and last rows are all zero pixels. By reusing zero pixels for processing the leftmost and rightmost edge pixels of the output, the amount of padding to be inserted for subsequent processing is minimized, the number of cycles required to insert padding is also minimized, and the use of buffer space is optimized. The batch reshape layer then sends the padded output to the next layer for the next processing operation.

Padding the output by the batch reshape layer may be further optimized using DMA. Because the pixels or elements of the first and last (i.e., top and bottom) rows of the output are contiguous in memory, the first and last rows of zero pixels can be appended to the output using DMA using minimal processing capability of the processing circuitry.

Padding inserted along the left edges of the batched images is optimally performed using bitmasks as the vector of batched image pixel data is streamed from a source buffer to an output buffer. For example, to insert zero pixels between the images in a series of 4-pixel by 4-pixel images or feature maps, as the image pixels of the image batch vector are streamed to memory, a processor may be configured to implement a bitmask such that every fifth position in the vector in the output buffer is not written with data from the source buffer.

In an implementation, processing circuitry implementing the inference model performs multiple downsizing operations as the image batch is processed. For example, a convolution layer before a batch reshape layer may downsize the images during its processing step, and the batch reshape layer pads the downsized batch to restore the padding around the downsized images of the image batch to its original dimensions. Alternatively, the batch reshape layer pads the image batch in anticipation of a downsizing operation of a pooling layer after the batch reshape layer. In still other implementations, the batch reshape layer is positioned between two downsizing layers, and the image batch is padded by the reshape layer according to the downsizing of both downsizing operations.

The output of the final or penultimate processing layer of the inference model is fed to an un-stitch layer which extracts the transformed images of the output corresponding to the input images of the image batch. In an implementation, to un-stitch the transformed images, the un-stitch layer removes extraneous padding, then separates the pixel data of each image in the batched input vector into individual vectors or data arrays corresponding to respective images in the image batch.

Turning now to the Figures, FIG. 1 illustrates operational environment 100 of batch-based DNN processing in an implementation. Operational environment 100 includes batch 105 of inputs received by processing circuitry 110 which includes inference model 115. Inference model 115 processes batch 105 according to layers of the model which include layer 120, batch reshape layer 125, and layer 130 which are performed in succession. The sequence of layer 120, batch reshape layer 125, and layer 130 is representative of a sequence of processing layers which may be performed multiple times by inference model 115 as batch 105 is processed. Additional example details of NNs can be found in commonly assigned U.S. patent application Ser. No. 18/153,764, entitled "Scheduling of Inference Models Based on Preemptable Boundaries," filed Jan. 12, 2023, U.S. patent application Ser. No. 18/067,089, entitled "Acceleration of 2D Dilated Convolution for Efficient Analytics," filed Dec. 16, 2022, and U.S. patent application Ser. No. 17/463,341, entitled "Reconfigurable Execution of Machine Learning Networks," filed on Aug. 31, 2021, each of which is incorporated by reference in its entirety.

Batch 105 is representative of a batch of activations or images to be processed by DNN-based inference model 115 such as for image recognition and classification, object detection for collision avoidance, facial detection or recognition, eye tracking, gaze estimation, and other image processing or computer vision uses. Each image of the batch 105 includes a row-by-column arrangement of pixels, e.g., a two-dimensional (2D) image may have an 8 by 8 pixel array. The images of batch 105 may be one-, two-, or three-dimensional. Each of the images of batch 105 may be different relative to the other images in batch 105. Alternatively, each image of batch 105 may include different portions of the same image relative to the other images in batch 105. Batch 105 can include one or more images.

Inference model 115 is representative of a DNN-based processing model based on a deep learning technique such as a convolutional neural network (CNN). Inference model 115 is organized according to layers which perform various processing steps, such as filtering, pooling, padding, applying activation functions, and so on. The convolutional layers transform the images of batch 105 to produce feature maps or transformed representations of the images. Successive applications of convolutional layers capture or reveal specific features or patterns in the images. Some layers, such as convolution layers and pooling layers, result in downsizing the input. Layers 120 and 130 of inference model 115 are representative of processing layers of the DNN model. Batch reshape layer 125 is representative of a processing step which performs an input padding operation during the processing of batch 105 prior to performing the operation of layer 130.

Figure 13:
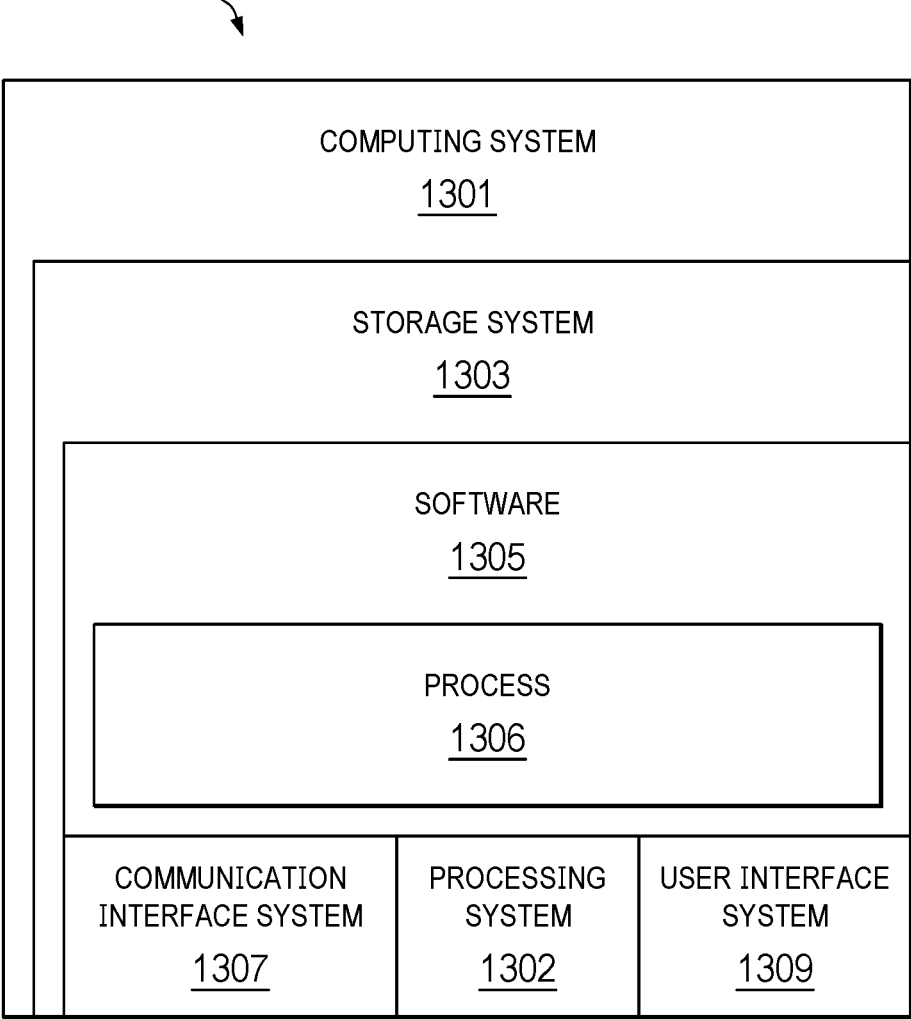
FIG. 13 illustrates a computing system suitable for implementing the various operational environments, architectures, processes, scenarios, and sequences discussed below with respect to the other Figures.

Processing circuitry 110 is representative of a vector processor such as Texas Instruments C7X or other processor device capable of vector or array processing. In some implementations, processing circuitry 110 includes specialized vector or matrix accelerators such as an MMA (matrix multiplication accelerator) for vector/matrix processing, deep learning accelerators, depth and motion accelerators, or video encoding/decoding accelerators. Processing circuitry 110 includes processors embedded with a parallel processing architecture such as VLIW (Very Long Instructional Word) or (Single Instruction, Multiple Data) SIMD. Processing circuitry 110 also includes processors capable of direct memory access (DMA) or DECDIM operation, discussed infra. Processing circuitry 110 may be implemented on one or more computing devices of which computing device 1300 in FIG. 13 is representative.

In operation, processing circuitry 110 receives batch 105 of images for processing by inference model 115 according to a DNN-based model. A stitching layer (not shown) of inference model 115 stitches together the images of batch 105 in a horizontally concatenated batch, in a vertically concatenated batch, or in a batch combining horizontal and vertical stacking. Whether to batch the images horizontally, vertically, or in some combination may be determined based on an estimation of the number of processing cycles which would be performed by processing circuitry 110 for each configuration and choosing the configuration estimated to use the least number of cycles.

Batching the input images of batch 105 for processing is comparatively more efficient use of processing circuitry 110 because the processing power of processing circuitry 110 is more fully utilized for the larger dataset of multiple images batched together than for the smaller dataset of, say, a single image of batch 105. For example, batching images horizontally can leverage the wider architecture of a SIMD processing architecture for more efficient processing. Moreover, the accumulated overhead of processing multiple smaller datasets of individually processed images becomes costly in terms of latency as compared to running the single, larger dataset of a batched input.

In a horizontally stacked batch, the images of batch 105 are stitched together along the height dimension of the images (i.e., along the left/right edges of the images or in a row-major format). For example, stitching together three 2D images that are each 8 pixels high and 8 pixels wide will form a batched input that is 8 pixels high and 24 pixels wide. Add to this that each image has, for example, 16 channels or feature maps, then the batched input will also have 16 channels, each with an 8-row by 24-column pixel array. Implementations involving 3D image inputs may include a third spatial dimension, depth.

In an implementation, the pixel data of each image of batch 105 is structured according to a 4D tensor but stored linearly in computer memory. The tensor dimensions of a 4D tensor include image number (N), channel number (C) for each channel of the image, and spatial location of the pixel in terms of row number (H) and position within a row (W). A tensor configuration is a correspondence between the 4D dimensions or addressing of a pixel and its position in a vector representation of the image in computer memory. With the NCHW configuration, for example, the pixels are sequentially numbered first according to their spatial location (position in row, then row number) in a channel, then according to channel number, and then according to image number. With the NHWC configuration, the pixels of an image are numbered first by iterating through channel numbers at a spatial location, then through spatial locations, then through image number. The techniques disclosed herein are applicable to NCHW and NHWC tensor configurations and to three-dimensional images or activations structured according to 5D tensors with no loss of generality.

In an implementation, when the batched input is created by stitching together the images of batch 105, a vector representation of the pixel data of the batched input is generated by based on the pixel data vectors of the images, for example, by concatenating the vectors according to image number N. The tensor address of each pixel corresponds to its linear address in the batched input vector according to the selected tensor configuration.

Subsequent to stitching together the batched input according to a selected tensor configuration, inference model 115 performs a series of DNN operations according to the hidden layers of the DNN engine, including layers 120 and 130. During the processing, batch reshape layer 125 receives output from layer 120 resulting from the operation performed by layer 120. Batch reshape layer 125 receives the output from layer 120 and pads the output by adding zero pixels to increase the spatial dimensions of the images of the output. In some examples, batch reshape layer 125 adds zero values or some other null values as padding around the images. The amount of padding added may be determined according to an earlier downsizing operation, in anticipation of an upcoming downsizing operation, or both. Padding may restore the padding around the downsized images of the image batch to its original dimensions or to greater dimensions, for example, if the images are subject to further downsizing. Batch reshape layer 125 then sends the padded output to layer 130 for the next processing step performed by layer 130.

Batch reshape layer 125 pads the output received from layer 120 in such a way as to minimize the amount of padding that is to be added on account of the downsizing which occurs as the output is processed by layers 120 and/or 130. In an implementation, to pad the output, batch reshape layer 125 inserts zero pixels (e.g., pixels with values of zero) along the top, bottom, and left edges of each image of the output, plus an additional pixel is added at the right end of the bottom row of zero pixels. For example, padding an 8×24 pixel array of three images of the output results in an array of 10 rows, where the top 9 rows are 27 pixels wide and the 10th row of the pixel array is 28 pixels wide, and where the first and last rows are all zero pixels. Notably, the right edge of the rightmost image of the output may not be padded, but instead the zero pixels added at the left edge of the leftmost image may be used for both edges during subsequent processing. That is to say, the leftmost zero pixel of row 2 is also the rightmost zero pixel of row 1, the leftmost zero pixel of row 3 is also the rightmost zero pixel of row 2, and so on. For the bottom (10th) row, there is no 11th row to "borrow" a zero pixel from, so the additional zero pixel is added at the right end. By reusing zero pixels for processing the leftmost and rightmost edge pixels of the output, the amount of padding to be inserted for subsequent processing is minimized, the number of cycles required to insert padding is also minimized, and the use of buffer space is optimized. Batch reshape layer 125 then sends the padded output to layer 130 for the next operation of the DNN process.

Padding the output by batch reshape layer 125 is further optimized using DMA. Because the pixels or elements of the first and last (i.e., top and bottom) rows of the output are contiguous in the memory of processing circuitry 110, the first and last rows of zero pixels can be appended to the output using DMA using minimal processing capability of processing circuitry 110. The first and last rows of zero pixels can be added at any time during the padding operation—i.e., at the beginning, at the end, or as other padding is performed.

Padding inserted along the left edges of the images in the output from layer 120 is optimally performed using bitmasks. For example, to insert zero pixels between the images in a series of 4-pixel by 4-pixel images or feature maps, as the image pixels are streamed to memory, the processor implements a bitmask such that every fifth position in the vector in the output buffer is not written with data from the source buffer.

In an implementation, zero pixels are added to the vector stream of pixel data of the output using a DECDIM operation. In a DECDIM operation, as pixels from a multidimensional array are streamed into a series of vectors of specified width, the processor adds one or more zero pixels to the vectors in the stream of vectors as the pixels are written from one memory location to another. Because the zero pixels are added during the write operation rather than during a dedicated padding operation, this results in a savings with regard to processing cycles. Additional example details of DECDIM operations can be found in commonly assigned U.S. Pat. No. 11,231,929, entitled "One-Dimensional Zero Padding in a Stream of Matrix Elements," filed May 23, 2019, and U.S. Pat. No. 11,392,316, entitled "System and Method for Predication Handling," filed May 24, 2019, each of which is incorporated by reference in its entirety.

Continuing with the discussion of FIG. 1, in an implementation, layer 130 performs a convolution operation which results in downsizing the padded output and its images. For example, if layer 130 performs a 3×3 convolution on the padded output, each of the width and height dimensions of the images in the padded output will be reduced by two pixels. Thus, an 8-pixel by 8-pixel image received by layer 130 will be downsized to a 6-pixel by 6-pixel image. However, with 1-pixel padding inserted by batch reshape layer 125, each 8×8 image is received by layer 130 as a 10×10 array and after processing by layer 130, the array is again 8×8. In other downsizing operations, such as max or average pooling, the image array dimensions may be reduced by a factor of 2, i.e., halving the width and the height. For example, a max pooling layer receiving an 8×8 image or feature map as input is downsized to a 4×4 array by the pooling operation.

In an implementation, inference model 115 performs multiple downsizing operations as batch 105 is processed. Inference model 115 may perform a padding operation, such as that of batch reshape layer 125, prior to a downsizing operation of layer 130 according to the predicted downsizing resulting from the operation. Thus, batch reshape layer 125 pads the output received by batch reshape layer 125 such that the output of layer 130 has the same dimensions (or greater) as the output received by batch reshape layer 125 from layer 120. For example, an output of 4×4 images received by batch reshape layer 125 and processed by layer 130 will be output as 4×4 images by layer 130. Alternatively, an output of 4×4 images received by batch reshape layer 125 may be padded or upsized to 8×8 images in anticipation of downsizing operations later on in the processing.

In some situations, layer 120 of inference model 115 downsizes the images during its processing step, and batch reshape layer 125 pads the output to restore the padding around the downsized images of the image batch to its original dimensions. Alternatively, batch reshape layer 125 may pad the output such that the image dimensions are greater than their original dimensions in anticipation of further downsizing.

The amount of padding added by batch reshape layer 125 according to the past downsizing or predicted downsizing of one or more layers is specified in terms of the pad width. For example, if a 3×3 convolution layer reduces image height and width dimensions by two pixels (i.e., one row of pixels across each of the top and bottom edges of the image and one column of pixels along each of the left and right edges of the image), processing circuitry 110 or inference model 115 may select a pad width of one pixel of padding to restore the padding around the downsized images of the image batch to its original dimensions The output of the final or penultimate processing layer of inference model 115 is fed to an un-stitch layer (not shown) which extracts the transformed images of the output corresponding to the input images of batch 105. In an implementation, to un-stitch the transformed images, the un-stitch layer removes any extraneous padding, then separates the pixel data of each image in the batched input vector into individual vectors or data arrays. To separate the pixel data, the un-stitch layer may determine the tensor dimensions or address of each pixel according to its position in the batched input vector and the tensor configuration used during the stitching process.

Figure 2:
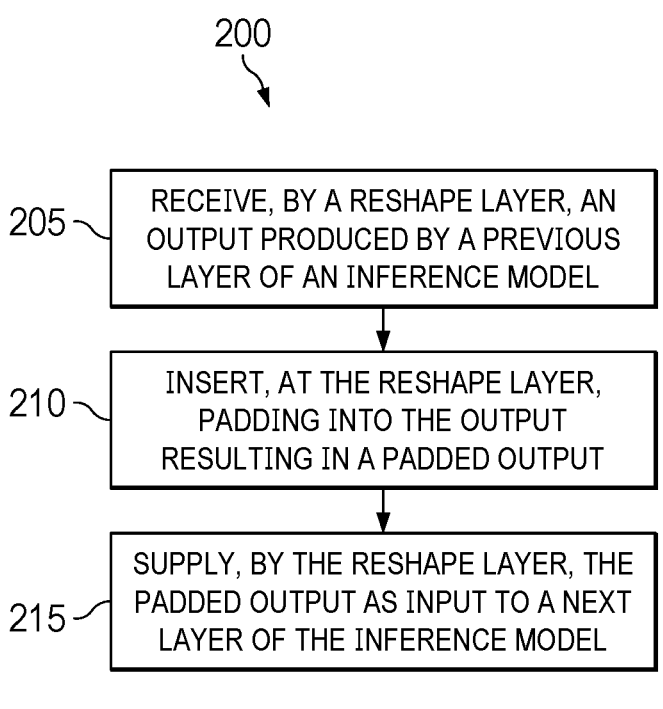
FIG. 2 illustrates a reshape process of batch-based DNN processing in an implementation.

FIG. 2 illustrates process 200 performed by an inference model of image processing circuitry, of which inference model 115 and processing circuitry 110 of FIG. 1 are representative. Process 200 may execute on image processing circuitry according to program instructions which direct the circuitry to function as follows, referring parenthetically to the steps in FIG. 2 and in the singular for the sake of clarity.

In an implementation, image processing circuitry receives batched input for processing. The batched input includes multiple images to be processed according to an inference model executing, in part, process 200. The batched input may include a vector or array of pixels from the multiple images. The inference model is based on, in some implementations, a DNN-based engine modified to include stitching and un-stitching layers as well as one or more reshape layers. A reshape layer of the inference model receives output from a previous layer (step 205). The previous layer is a processing layer of the inference model which precedes the reshape layer and which performs a processing operation on the batched input. The output of the previous layer may be a feature map resulting from processing performed by the previous layer.

The reshape layer of the inference model inserts padding into the output received from the previous layer, resulting in padded output (step 210). In an implementation, the reshape layer adds padding to the output according to predicted downsizing that will occur during processing by a later layer, such as the next layer, or according to past downsizing that occurred during processing by an earlier layer, such as the previous layer. A pad width of the padding to be added to the output is determined based on the past or predicted downsizing. The zero pixels are pixels containing values of zero for color and/or intensity values such that the zero pixels contribute no information to the inference model.

The padding that is added by the reshape layer includes row padding and side padding. Side padding corresponding to the pad width is added to the left edges of the images, which may be added using a bitmask or other technique. Row padding corresponding to the pad width is added at the top and bottom edges of the images, which may be added using DMA or other technique. A quantity of additional zero pixels corresponding to the pad width is appended to the bottommost row of the padded output.

In a brief example of padding, if the output of the previous layer contains 12-pixel×12-pixel images, and if the next layer performs a 5×5 convolution, the predicted downsizing of the next layer is 4 pixels across each of the width and the height (in other words, the dimensions of the output of the next layer will 8×8). The inference model determines the pad width to be 2 pixels which upsizes the images of the output to 16×16, so that the output of the next layer will have its original 12×12 dimensions. To pad the output, the reshape layer adds or inserts zero pixels to the vector stream of the output such that each image in the output will have two rows of zero pixels added along the top edge and along the bottom edge (row padding), and two columns of zero pixels along the left edge (side padding). An additional number of pixels corresponding to the pad width (i.e., 2 pixels) is appended to the bottommost row (i.e., the 16th row) so that the width of the bottommost row is greater than the width of the rows above it by number of zero pixels equal to the pad width (i.e., 18 pixels). For tensors of multiple channels, padding can also be reused between the channels of an image. For example, the top left padded pixel of channel N will act as the bottom right padded pixel of channel N-1. For the final channel of the image, an additional pixel is added at the end of the bottom row as there is no next channel from which to borrow a padded pixel.

In an implementation, inserting side padding between images of the output from the previous layer is accomplished by inserting zeros as each row of the output is written from one memory location to another. In horizontally concatenated image batches, for example, because the columns of zero pixel padding are used for both the right edge of one image and the left edge of the next image during image processing, a quantity of zero-pixel columns equal to the pad width is inserted between the adjacent rows of the images. Notably, it is not necessary to add padding to both of the adjacent edges of two adjacent image because, during the processing by the next layer, the padding added at the left edge of one image is also used for the right edge of the adjacent image. Reusing side padding between two images reduces the amount of processing that the processing circuitry must perform. And although side padding adds to the number of processing cycles the processing circuitry performs, processing is further optimized using a DECDIM operation. (In contrast, row padding—adding top and bottom rows of zero pixels to the images—can be accomplished without additional processing using DMA.)

In a DECDIM operation, number of zeros bits or pixels can be specified which are to be appended to the end of a vector as the vector is written from one memory location to another. By inserting the zero pixels during or in conjunction with the write operation, this obviates the need for additional processing cycles solely for the purpose of inserting side padding.

Next, the reshape layer supplies the padded output as input to the next layer of the inference model (step 215). In an implementation, the padded output sent by the reshape layer to the next layer is a batched input vector which includes the zero pixels added by the reshape layer. In various implementations, the padded output may be downsized by a later layer, such as the next layer, which may result in some or all of the padding added in step 210 being removed.

In other implementations, steps 205-215 are performed in scenarios in which padding is added after a downsizing operation. For example, the batched input is downsized during the operation of an earlier layer, such as the previous layer. The reshape layer receives the (downsized) output from the earlier layer and adds padding to restore the padding around the images of the output to their original dimensions or to greater dimensions. The reshape layer then sends the padded output to the next layer for processing.

Referring again to FIG. 1, operational scenario 100 illustrates a brief example of process 200 as employed by elements of operational scenario 100.

In operational scenario 100, processing circuitry 110 receives batch 105 of images for processing by inference model 115. In an implementation, inference model 115 is a DNN-based model modified to include a stitch layer (not shown), an un-stitch layer (not shown), and one or more reshape layers of which batch reshape layer 125 is representative.

To create the batched input, processing circuitry 110 concatenates the multiple images of batch 105 for batch processing by inference model 115. The images may be stitched together by the stitching layer horizontally or vertically or in a combination of horizontal and vertical stacking. In the case of horizontal batching, the resulting rows of the batched input will be processed more efficiently by a SIMD-based vector processing architecture as compared to processing the images individually. A decision on the batching configuration (i.e., how the images should be batched) is made dynamically prior to the start of processing by estimating the number of processing cycles which would occur for each the batching configuration and selecting the batching configuration with the fewest estimated processing cycles.

As the batched input is processed by inference model 115, at various layers of the model, the batched input is downsized. For example, a pooling layer of inference model 115 may reduce image dimensions by factor of 2 such that for an input image with spatial dimensions H×W, the output of the pooling layer has spatial dimensions H/2×W/2. For a convolutional or spatial filtering layer, the amount of downsizing that occurs depends on the size of the convolutional kernel and the stride of the convolution operation. For example, for an 8×8 image, a 3×3 kernel with a stride of 1 will result in a 6×6 output image. Applying a second convolutional operation of the same type will result in a 4×4 output image.

Based on downsizing occurring at different layers of the processing performed by inference model 115, batch reshape layer 125 pads the batched input by adding zero pixels along the edges of the images. For example, either of layers 120 and 130 may perform an operation which downsizes the batched input. Batch reshape layer 125 may pad the output of layer 120 to restore the padding around the batched input to its original dimensions where the layer 120 is a downsizing layer. Alternatively, batch reshape layer 125 may pad the output of layer 120 in anticipation of the downsizing which will occur when layer 130 processes the padded output. In still other implementations, batch reshape layer 125 may do both, that is, add sufficient padding to not only restore the padding around the images to their original dimensions after downsizing by layer 120 but also in anticipation of downsizing occurring with layer 130. In some implementations, other processing layers are situated between layer 120 and batch reshaping layer 125 and/or between batch reshape layer 125 and layer 130.

To add padding, batch reshape layer 125 inserts zero pixels between the images of the output from layer 120 and along the free or unstitched edges of the images (i.e., the edges which do not face another image). Padding between a pair of images is added such that the zero pixels are reused by each image of the pair of images during processing to minimize the number of additional processing cycles used for padding. To add padding between pairs of images, processing circuitry 110 inserts zeros as the output is written by processing circuitry 110 from one memory location to another. To add padding along the free edges of the images, zero pixels are added by DMA with minimal or no use of processors of processing circuitry 110.

When the batched input reaches the final or penultimate processing layer, an un-stitching layer extracts the output images corresponding to the images from the batched input and removes any remaining padding.

Figure 11:
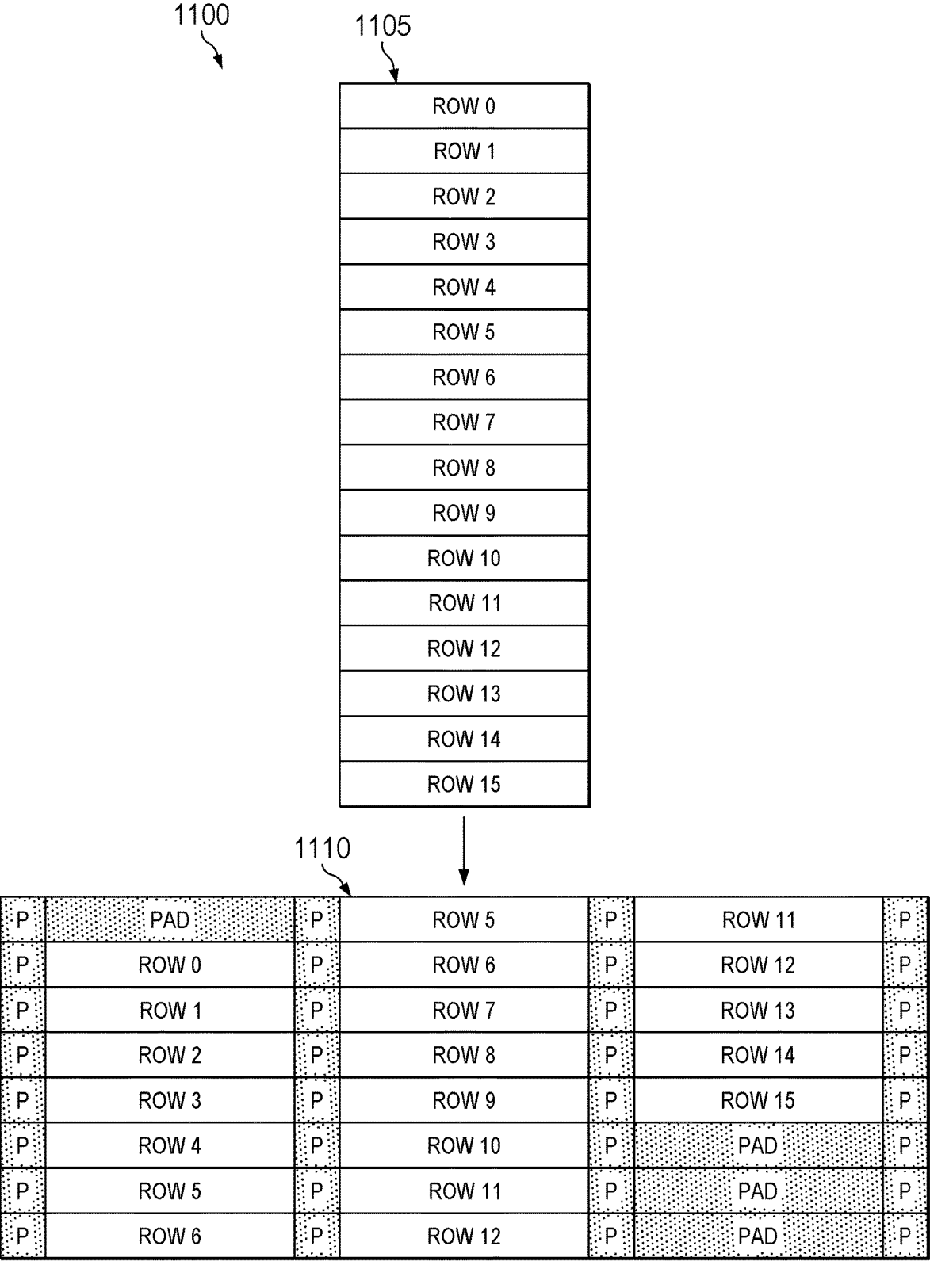
FIG. 11 illustrates an operational scenario of batching a single input for batch-based DNN processing in an implementation.

In an implementation, inference model 115 can be used to process a single image in batch mode with padding (as shown in FIG. 11). To process a single image, the image is split into portions (with each portion serving as an image), padded, horizontally stacked, stitched together, and processed as a batch. (In the following example, a pad width is specified to be one pixel.) When the image is split, two rows above the split are duplicated for padding purposes. For example, an image of 16 rows numbered 0-15 is separated into three portions: rows 0-6, rows 5-12, and rows 11-15. (Rows 5, 6, 11, and 12 are duplicated.) Each portion will contain eight rows which includes one row of padding at the top and the bottom. For the first portion, containing rows 0-6, the image rows are rows 0-5. A top row of padding is added along the top edge and row 6 serves as padding at the bottom. A column of padding (i.e., zero pixels) is added at the left edge of the first portion. For the second portion, containing rows 5-12, the image rows are rows 6-11, and rows 5 and 12 serve as padding. A column of padding is added at the left edge of the second portion. For the third portion, containing rows 11-15, rows 12-15 are image rows. Row 11 serves as padding, and three rows of padding are added at the bottom so that the third portion has the same number of rows as the other portions. A column of padding is added at the left edge of the third column and, as with the batching of multiple images, an additional zero pixel is added to the right end of the bottom row. So configured, the single image is then processed by inference model 115. The method can be modified for additional padding or no padding—duplicating more rows for more padding, or no duplication when no padding is specified. As the batched portions are processed, if additional padding is needed due to downsizing, the portions can be padded by a reshape layer as is done for batches of multiple images. At the end of processing, the un-stitch layer removes any extraneous padding and duplicate rows.

Figure 3:
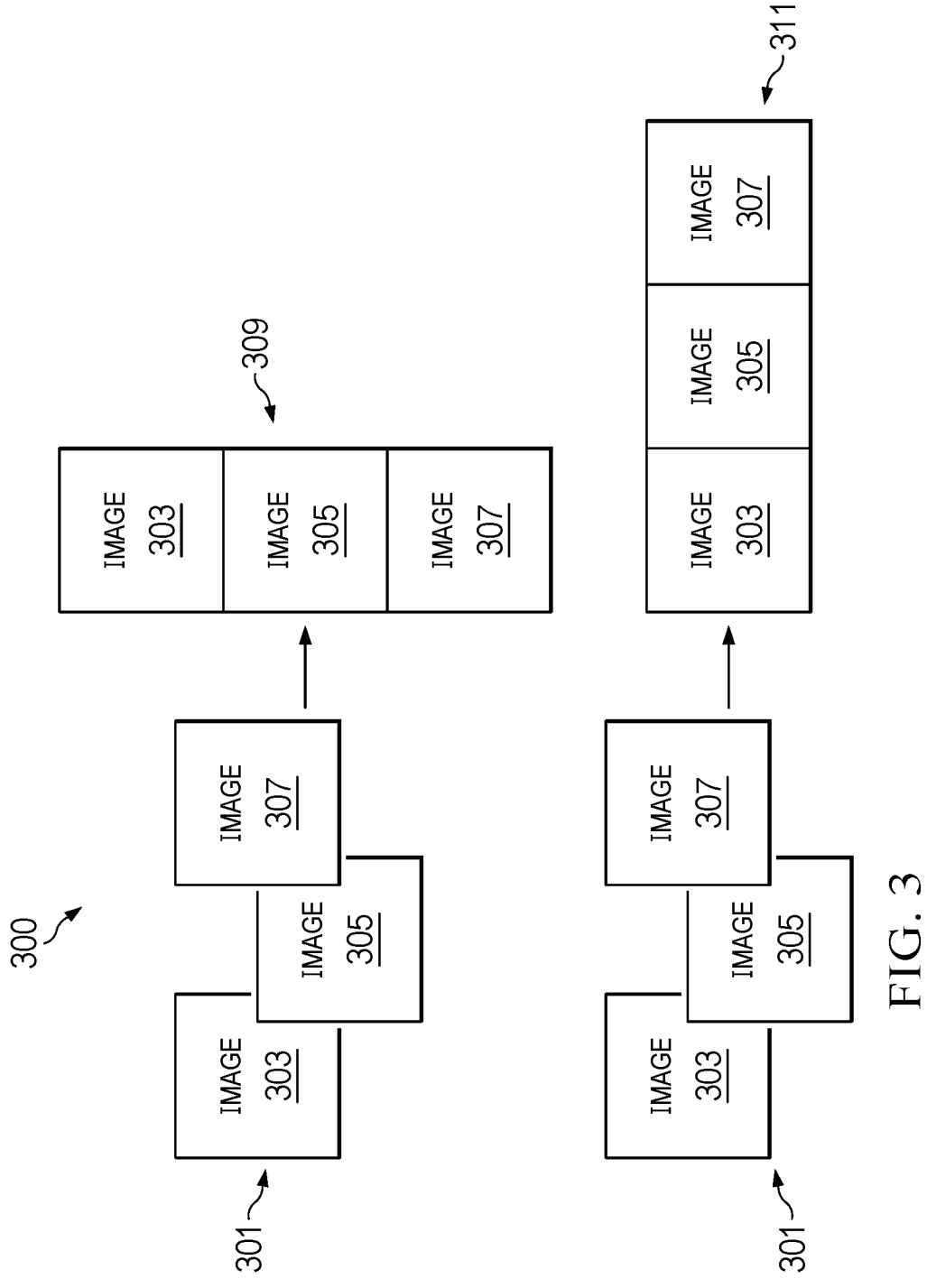
FIG. 3 illustrates an operational scenario of batching inputs for batch-based DNN processing in an implementation.

FIG. 3 illustrates in operational scenario 300 various input stacking or batching operations performed by a stitching layer of a modified DNN-based engine in an implementation. In operational scenario 300, images 303, 305, and 307 are representative of images with dimensions H×W and which include multiple channels C, such as C=0, 1, 2, . . . 15. It may be appreciated that although three images are shown for batch 301, the number of images can be larger or smaller than what is shown. Batch 301 of images 303, 305, and 307 are stitched together by vertically concatenating the images, resulting in batched input 309. The dimensions of batched input 309 without padding are 3H×W. Batching images 303, 305, and 307 includes stitching together the images for each of the corresponding channels.

In an alternative batching arrangement, batch 301 of images 303, 305, and 307 are stitched together by horizontally concatenating the images, resulting in batched input 311. The dimensions of batched input 311 without padding are H×3W. Image processing circuitry operating a modified DNN-based inference engine may pad batched input 311 by inserting side padding between each pair of images and adding rows of zero pixels across the top and bottom edges of the batched input. The extent to which images can be horizontally concatenated may be determine according to the processing architecture of the image processing circuitry. For example, the number of images which can be batched together horizontally may depend in part on the image dimensions and a predicted amount of padding so that the batched input does not exceed the width of the, say, SIMD architecture of the image processing circuitry during processing.

Figure 4:
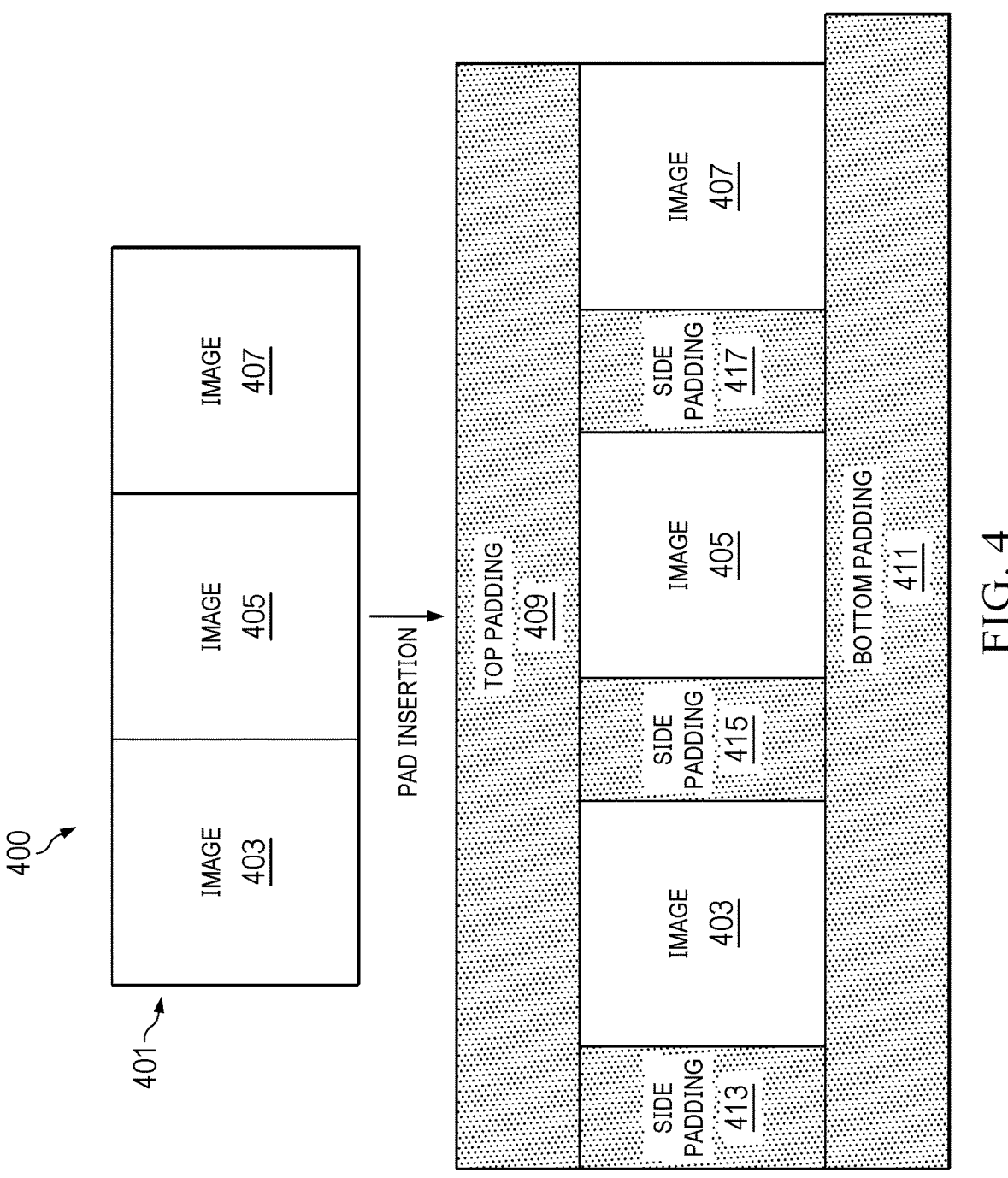
FIG. 4 illustrates an operational scenario of pad insertion during batch-based DNN processing in an implementation.

FIG. 4 illustrates in operational scenario 400 padding a horizontally concatenated batched input in an implementation. In operational scenario 400, images 403, 405, and 407 are representative of images with dimensions H×W and which comprise multiple channels C. It may be appreciated that although batch 401 is shown with three images, the number of images can be larger or smaller than what is shown. Images 403, 405, and 407 are stitched together by a stitching layer of a modified DNN-based inference engine executed by image processing circuitry. Batched input 401 of images 403, 405, and 407 is subject to downsizing by a layer of a modified DNN-based inference engine during processing. Padding is added to batched input 401 by a batch reshape layer of the inference engine by adding or inserting zero pixels along the sides and edges of images 403, 405, and 407 according to a pad width determined by the image processing circuitry which, for the sake of clarity, is shown in operational scenario 400 to be one pixel.

In an implementation, side padding 413, 415, and 417 of the determined pad width, i.e., one pixel wide, is added between the images of batched input 401. To add the side padding, the image processing circuitry uses a bitmask as the vector representation of batched input 401 is written from a source buffer to an output buffer. The image processing circuitry also uses a DECDIM operation to append zero pixels to the vector streams of the vector representation during the writing process. Row padding (top padding 409 and bottom padding 411) of the determined pad width, i.e., one row of zero pixels, is added to the top and bottom edges of batched input 401 using a DMA process. Notably, the row of bottom padding 411 is longer than the row of top padding 409 and the image rows. In an implementation, during processing by, for example, a convolution layer, the edge pixels along the right edge of image 407 use the zero pixels from side padding 413, offset by a row, for the convolution. For example, row 1 uses the zero pixel of row 2 of side padding 413, row 2 uses the zero pixel of row 3 of side padding 413, and so on. Because there is no row below the row of bottom padding 411, an additional pixel is added to the end of that row which allows the convolution filter to be applied to the pixel at the bottom right corner of image 407.

Figure 5:
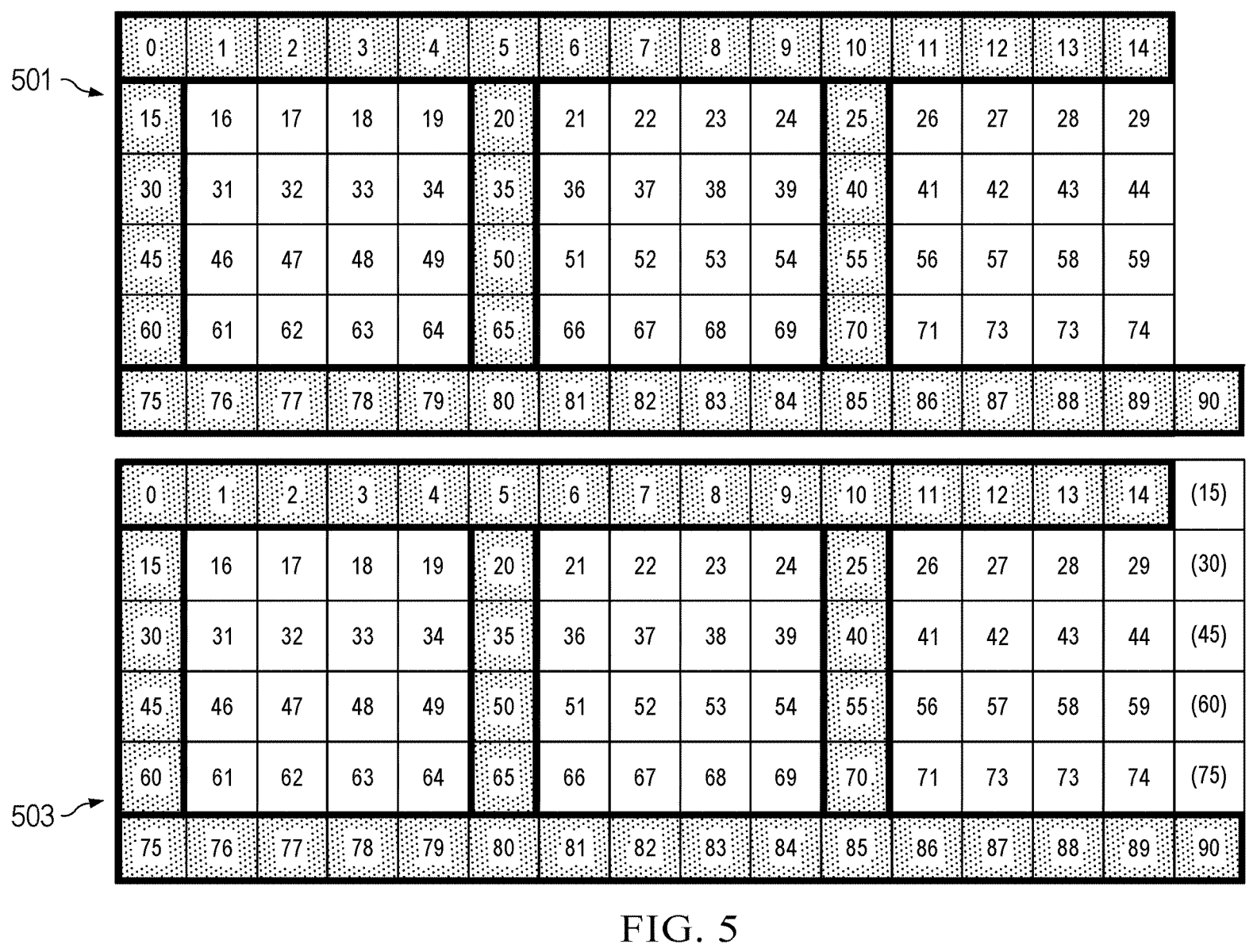

FIG. 5 illustrates views 501 and 503 of a vector representation of a batched image input which is processed by a modified DNN-based inference engine in an implementation. In particular, FIG. 5 illustrates the concept of reusing zero pixels during a downsizing operation by a layer of the inference engine.

The batched image input shown in views 501 and 503 is stored in memory as a one-dimensional vector of pixels 0-90. The vector of the batched image input includes image pixels (unshaded) and zero pixels (shaded) which were added or inserted as padding by a batch reshape layer of the inference engine. The vector illustrated in views 501 and 503 includes three images or feature maps which are 4 pixels wide by 4 pixels high. Row and side padding of a 1-pixel pad width is added to the left edges of the images and across the top and bottom rows of the batched input.

In an implementation, the batched image input illustrated in view 501 is filtered by a 3×3 convolution layer with a stride of 1, producing a feature map output with no padding. The 3×3 convolution filter processes each image pixel using a 3×3 subarray centered on each image pixel. To process pixel 53, for example, the 3×3 subarray includes pixels 37, 38, 39, 52, 53, 54, 67, 68, and 69, at the center of which is pixel 53.

Continuing with FIG. 5, to process each of pixels 39 and 41, the respective 3×3 subarrays overlap, with both including zero pixels 25, 40, and 55. In fact, pixel 40 falls with the 3×3 subarray of six different pixels: 24, 39, 54, 26, 41, and 56. Thus, side padding pixels are reused as various image pixels are processed.

View 503 illustrates a scenario involving processing edge pixels of the right edge of the rightmost image. As shown in view 503, side padding pixels 15, 30, 45, and 60 are borrowed or reused for processing the right edge of the rightmost image. To process pixel 29, for example, the convolution filter processes a 3×3 subarray which includes pixels 13, 14, 15, 28, 29, 30, 43, 44, and 45. Algorithmically, the relative referencing to the pixels surrounding the center pixel of a 3×3 subarray is the same for every image pixel.

Finally, to process image pixel 74, the respective 3×3 subarray uses zero pixels 45, and 75 from the leftmost side padding, along with zero pixels along the bottom row, 88, 89, and 90. Because there is no row below pixels 75-90, during the padding operation, pixel 90 is accordingly appended to the bottom row.

Figure 6:
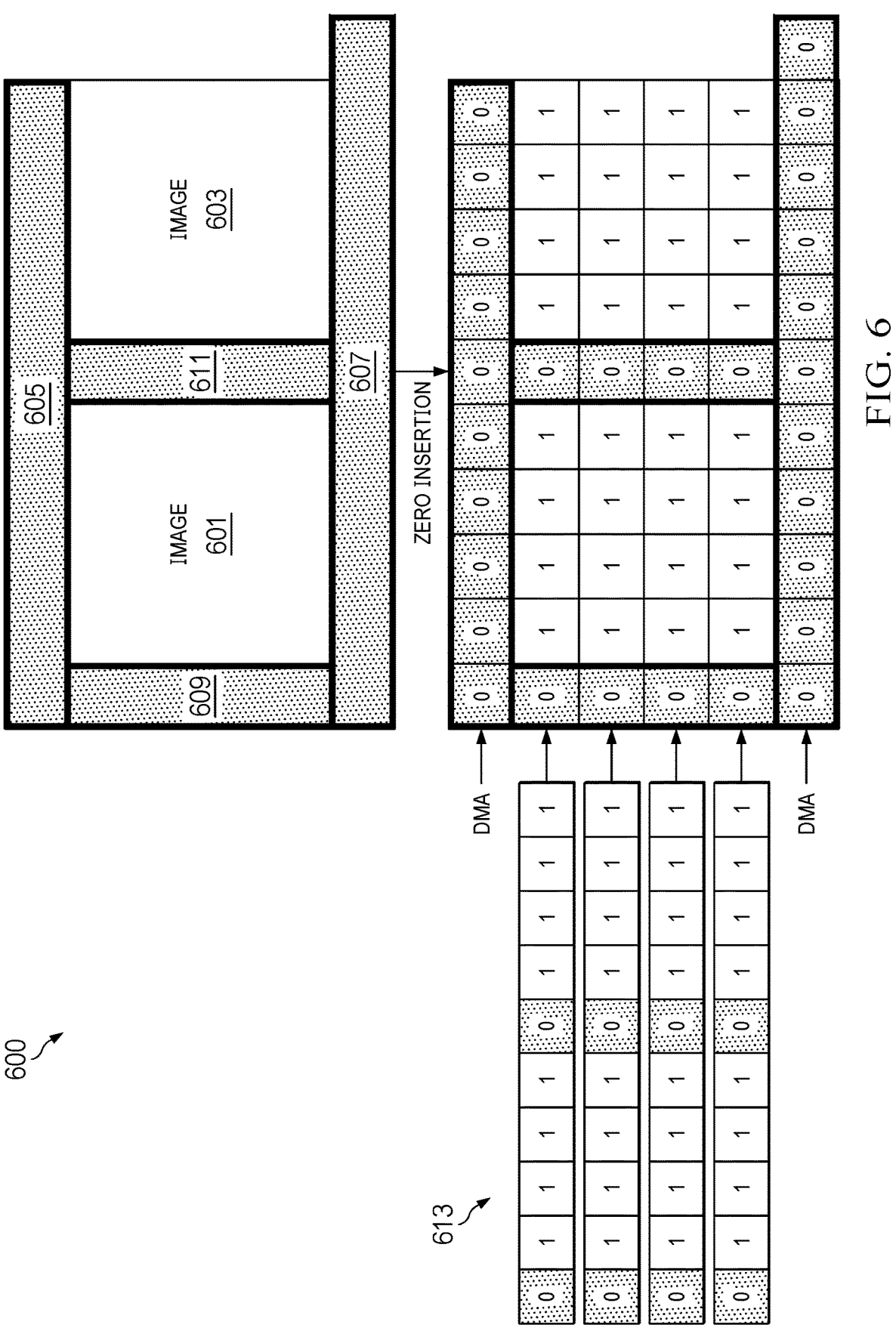
FIG. 6 illustrates an operational scenario of padding during batch-based DNN processing in an implementation.

Turning now to FIG. 6, operational scenario 600 illustrates row and side padding using a bitmask operation and DMA during image processing by a modified DNN-based inference engine in an implementation. In operational scenario 600, a batched input of images 601 and 603 which are horizontally stacked and stitched together is padded by a batch reshape layer of the inference engine. Side padding 609 and 611 is added at the left edges of images 601 and 603 of the batched input using a bitmask operation in the context of vector predication. As batched input vector is written from a source buffer to an output buffer, bitmask 613 masks memory locations corresponding to where zero-pixel padding is to be added or inserted. For example, as shown, the dimensions of images 601 and 603 are 4-pixel by 4-pixel. The image processing circuitry executing the inference engine determines that padding must be added to the batched input before or after a downsizing operation. To pad the batched input with 1-pixel padding, bitmask 613 is configured to add a single zero-pixel along the left edges of images 601 and 603. As the batched input vector is written to the output buffer, bitmask 613 masks 10-element sequences such that a zero pixel is positioned alongside a sequence of four image pixels for each image. Thus, the zero pixels are inserted as the vector is written in memory rather than by performing additional processing solely for the purpose of adding side padding.

Row padding 605 and 607 is added along the top and bottom edges, respectively, of side-padded images 601 and 603 of the batched input using a DMA operation. Because row padding 605 and 607 are contiguous blocks of zero pixels in the computer memory, this operation can be delegated by the processor to a DMA controller of the processing circuitry. In operation, the processor initiates the DMA operation by the DMA controller but is not required to participate in the operation, thus saving on processing cycles. Upon completion, the DMA controller signals to the processor that the write operation is complete. Row padding can be performed before or after side padding.

In some implementations, a processor capable of performing a DECDIM operation can also be used to insert zero pixel for a padding operation where zero pixels are to be appended at the end of a row of pixels. For example, a row of image pixels can be read from a source buffer by the DECDIM operation and appended with a specified number of zero pixels.

Figure 7:
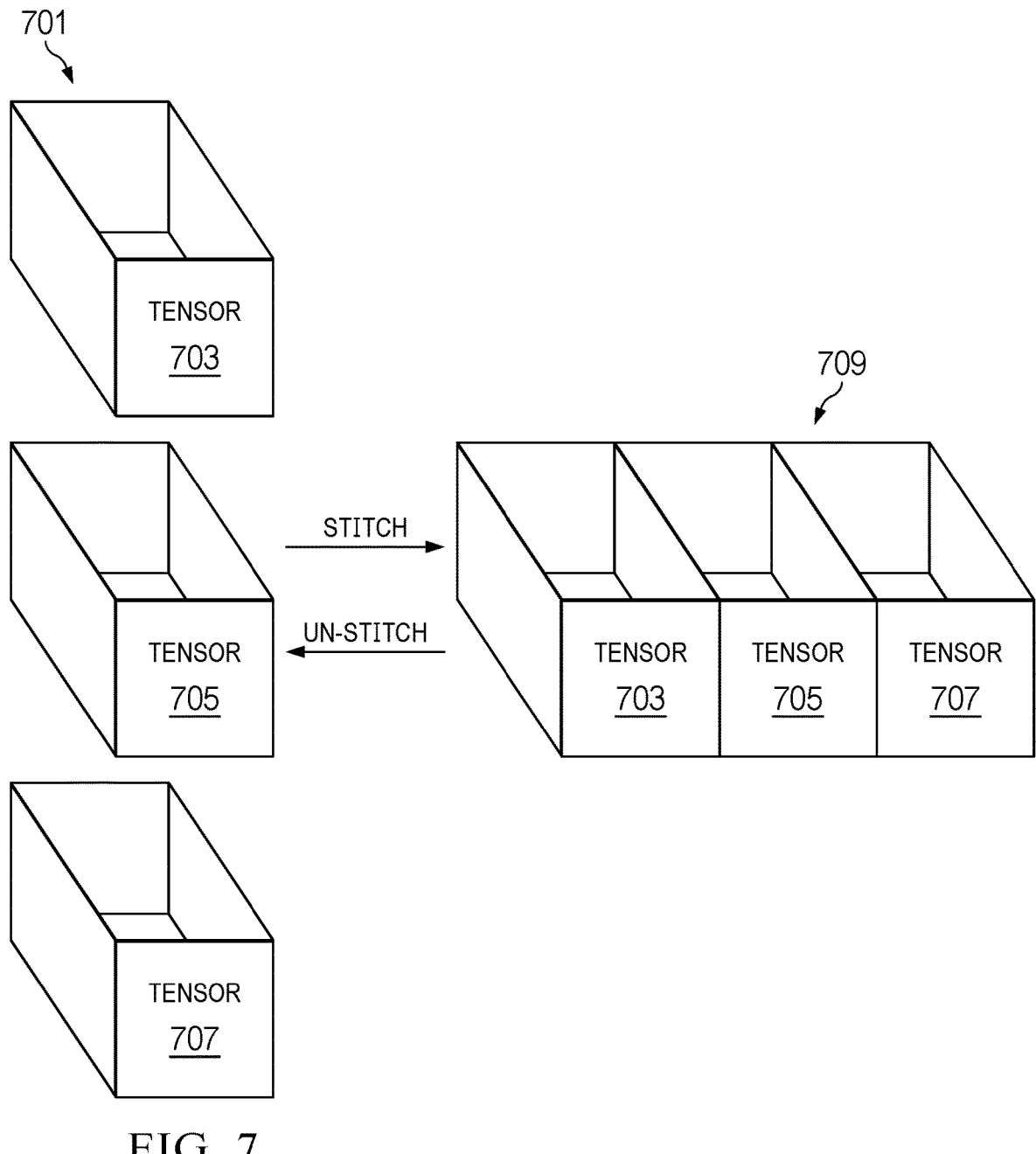
FIG. 7 illustrates an operational scenario of stitching and unstitching during batch-based DNN processing in an implementation.

FIG. 7 illustrates an operational scenario 701 of stitching and unstitching operations performed by stitch and un-stitch layers of a modified DNN-based inference engine in an implementation. Each of tensors 703, 705, and 707 includes pixel data corresponding to an image to be processed by the inference engine, where the images are entirely different relative to each other. For example, images which are entirely different relative to each other can include images which were each captured individually, images each of which contain an object that is not contained in another image in the batch, images taken at different moments in time relative to each other, images taken from different perspectives relative to each other, or images captured by different cameras relative to each other. In operational scenario 701, tensors 703, 705 and 707 are horizontally batched and stitched together by a stitch layer, creating batched input 709. Batched input 709 is processed according to a batch-based DNN image processing model of the inference engine. Upon the completion of the batch-based DNN processing, an unstitch layer of the inference engine un-stitches or separates the output feature maps or images of tensors 703, 705, and 707. It may be appreciated that although FIG. 7 illustrates three tensors, the number of tensors stitched together in a batched input can be more or less than three.

In operational scenario 701, tensors 703, 705, and 707 are representative of four-dimensional tensors of pixel data, with each tensor corresponding to one activation or image. Pixel data in tensors 703, 705, and 707 are organized according to four tensor dimensions, N (image or activation number), C (channel or feature map number), and spatial dimensions H (image height) and W (image width). For example, N=0 may correspond to pixel data of tensor 703, N=1 to tensor 705, and N=2 to tensor 707. Each of tensors 703, 705, and 707 includes one or more channels or feature maps designated as C=0, 1, 2, and so on. Each image of tensors 703, 705, and 707 has dimensions H×W, where H and W are a number of pixels corresponding to the height and width of the images, respectively. As illustrated, the three-dimensional quality of tensors 703, 705, and 707 is representative of the three tensor dimensions C, H, and W. In implementations involving 3D images, a third spatial dimension, depth, may be included in a 5D tensor. Vector data stored in a 4D tensors may be configured according to NCHW or NHWC formatting.

Figure 8:
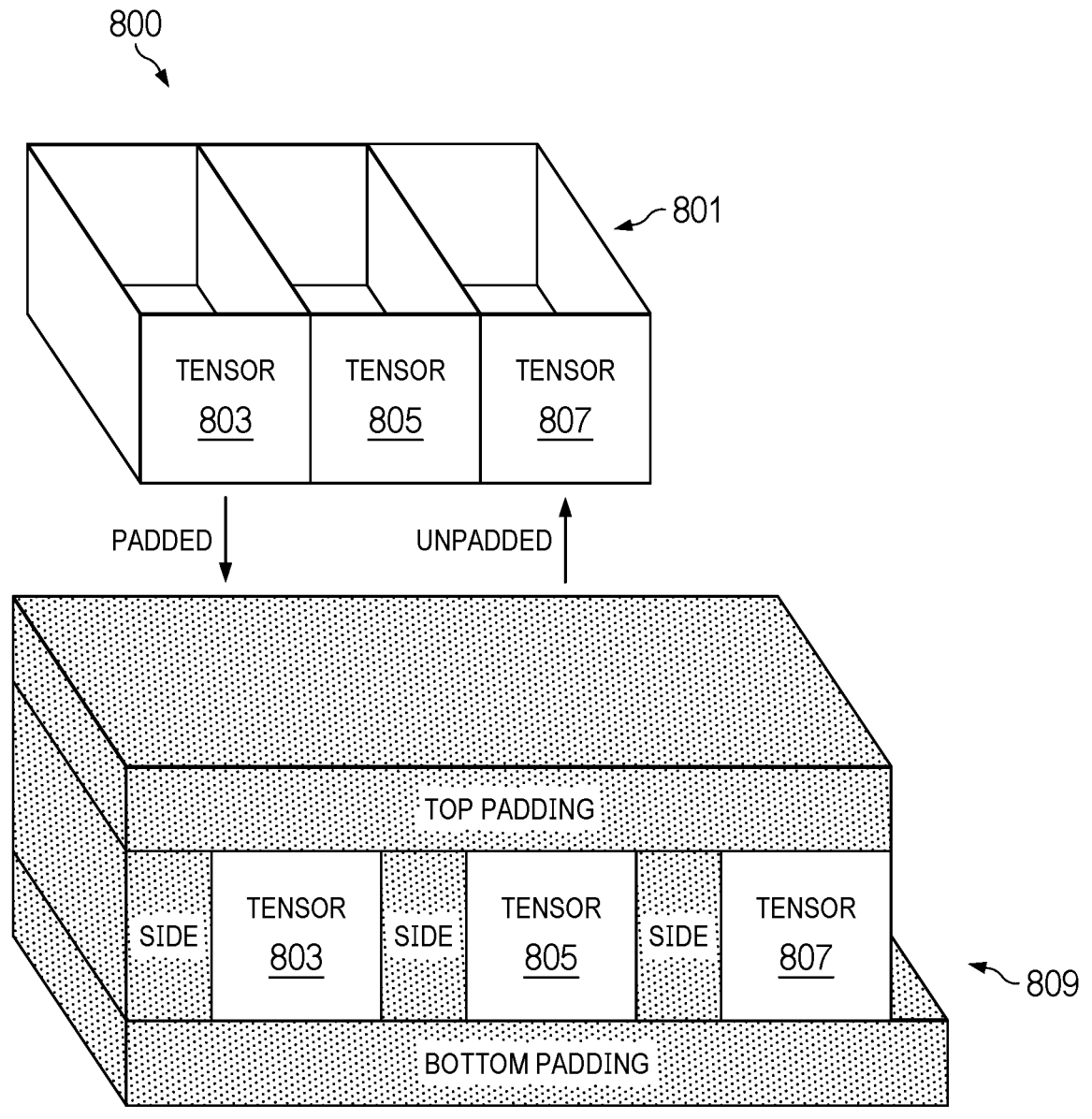
FIG. 8 illustrates an operational scenario of padding during batch-based DNN processing in an implementation.

FIG. 8 illustrates operational scenario 800 of padding batched input 801 performed by a batch reshape layer of a modified DNN-based inference engine in an implementation. In operational scenario 800, batched input 801 includes tensors 803, 805, and 807, each corresponding to an image of a batch of images to be processed. As illustrated, the three-dimensional character of tensors 803, 805, and 807 is representative of the three tensor dimensions C, H, and W. When batched input 801 is padded by a batch reshape layer, padding is added to each tensor with respect to the spatial dimensions of the pixels but also with respect to the channel number. In padded batched input 809, side padding is added to the left edges of tensors 803, 805, and 807 for every channel. For a tensor of multiple channels, top and bottom padding is added to allow the reuse of padded pixels from previous channels of the tensor. For example, in a tensor with multiple channels, the top left padded pixel of a channel (e.g., channel N) will act as the intended bottom right padded pixel for the previous channel (e.g., channel N-1).

Figure 9:
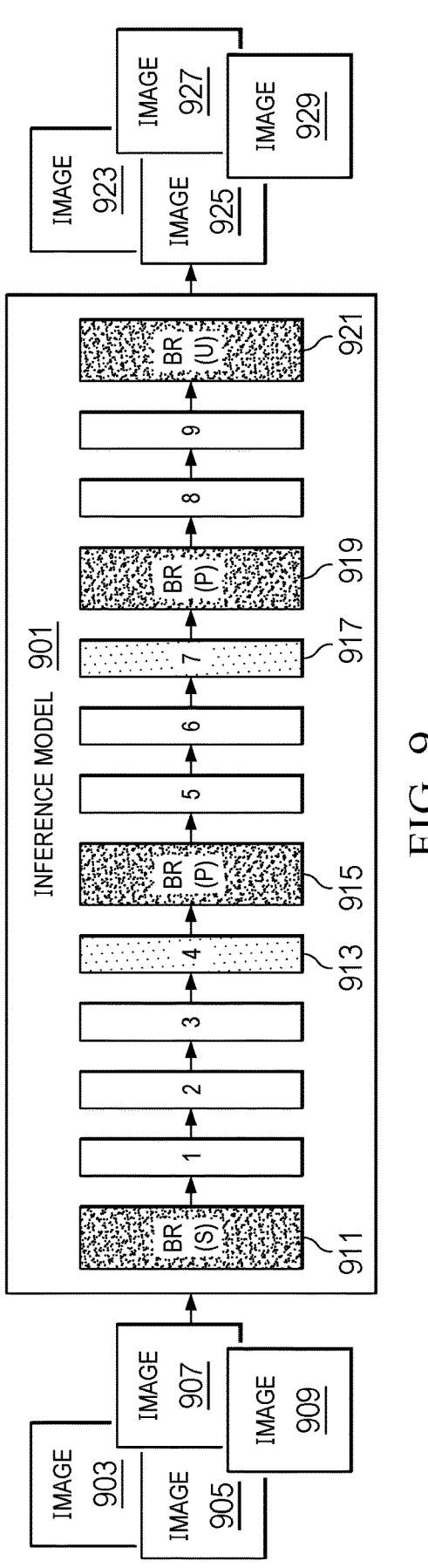
FIG. 9 illustrates an operational scenario of image processing by a modified DNN-based inference model an implementation.

FIG. 9 illustrates an operational architecture of inference model 901 based on a modified DNN-based model for image processing in an implementation. In FIG. 9, input images 903, 905, 907, and 909 are received as input to stitching layer 911 of inference model 901. Stitching layer 911 stitches together images 903, 905, 907, and 909 in a horizontally stacked configuration. Each of layers 1-9 perform a step in the sequence of processing operations on the batched input outputted by stitching layer 911. Layers 913 and 917 (shaded) represent processing operations which result in downsizing the output received from the preceding layers. For example, layer 913 may represent a convolutional or spatial filtering layer and layer 917 may represent a max pooling or average pooling layer. Layers 915 and 919 represent reshape layers. Un-stitch layer 921 represents a layer which unstitches or separates the images received from the output of layer 9, after processing of the images by inference model 901 is complete. Unstitching by un-stitch layer 921 results in output images 923, 925, 927, and 929. Each of output images 923, 925, 927, and 929 corresponds to one of input images 903, 905, 907, and 909.

In an implementation, reshape layer 915 receives output from layer 913. Inference model 901 or the processing circuitry executing inference model 901 determines how much padding must be added to the output to restore the padding around the downsized images of the output to its original dimensions, that is, to the dimensions of images 903, 905, 907, and 909 prior to processing. For example, inference model 901 may determine that a pad width of two pixels must be added to or inserted in the output of layer 913. Reshape layer 915 inserts two columns of zero pixels along the left edges of each image of the output and adds two rows of zero pixels to the top and bottom edges of the output. Reshape layer 915 sends the padded output to layer 5 for further processing.

At layer 917, the batched input is again downsized during processing by that layer. The output of layer 917 is received by reshape layer 919. Inference model 901 determines that one pixel of padding must be added to the output of layer 917. Reshape layer 919 inserts one column of zero pixels along the left edges of each image of the output and adds one row of zero pixels to the top and bottom edges of the output. Reshape layer 919 sends the padded output to layer 8 for further processing. Upon reaching un-stitch layer 921, output images 923, 925, 927, and 929 are separately identified from the output.

In various implementations, the position of reshape layers 915 and 919 may be determined by estimating the processing power required for various layer configurations and selecting the most processing-efficient configuration. Alternative layer configurations include padding the batched images before downsizing layers 913 and 917 or performing a single padding operation by reshape layer 915 which adds padding to the output of layer 917 based on the downsizing of both downsizing layers (and removing reshape layer 919), an example of which is illustrated in FIG. 10.

Figure 10:
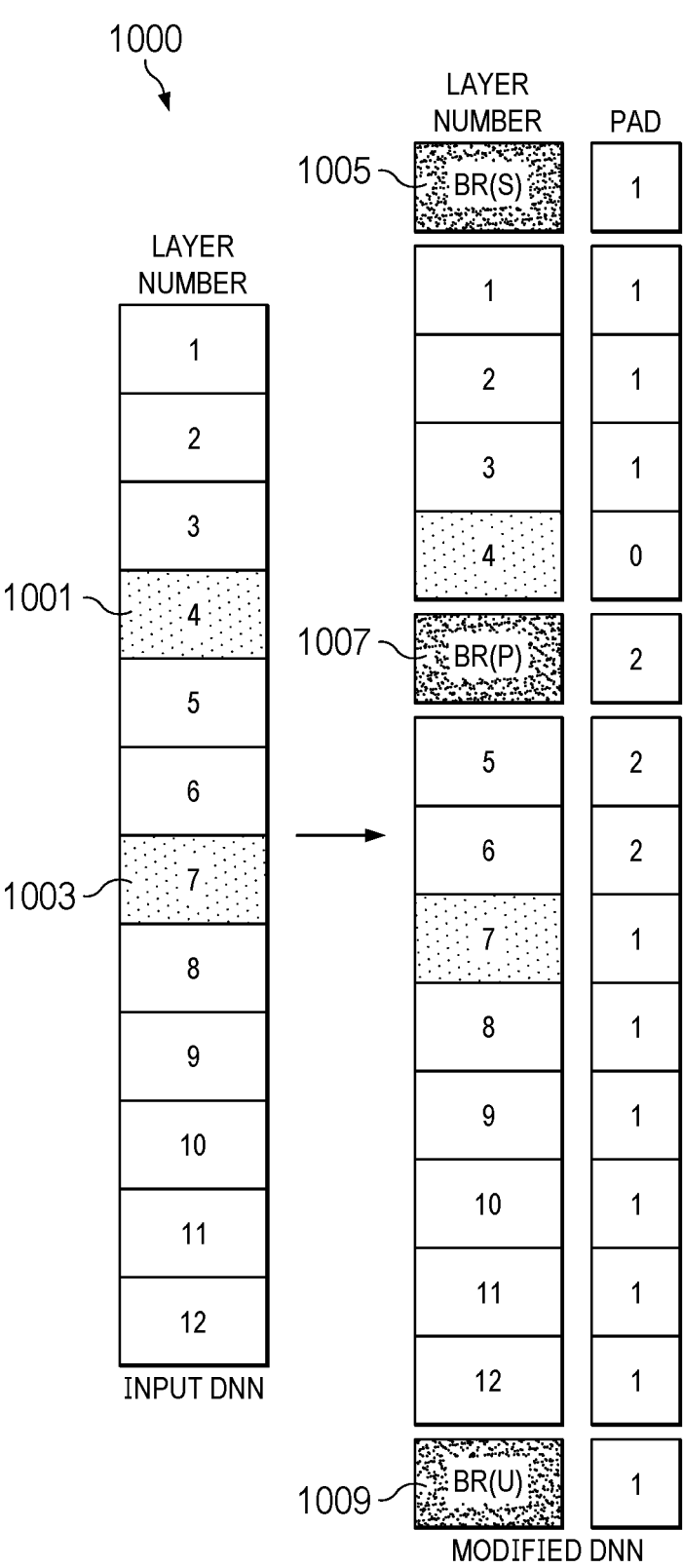
FIG. 10 illustrates modifying a DNN-based inference model in an implementation.

FIG. 10 illustrates operational architecture 1000 which includes a modification of a DNN-based inference model in an implementation. In operational architecture 1000. A DNN-based image processing model of 12 layers includes layers 1001 and 1003 which result in downsizing the images of a batched input. The DNN-based model is modified by adding stitching layer 1005 at the beginning of the process, reshape layer 1007 between downsizing layers 1001 and 1003, and unstitching layer 1009 at the end of the process.

In operation, stitching layer 1005 of the modified DNN model stitches together a batch of images which include padding of pad width 1. The batched input is processed by layers 1-3 with no change to the padding by any of the processes of those layers. At layer 4, however, the batched input is subject to downsizing as a result of the operation of layer 4, and the padding is eradicated (i.e., pad width is 0). The output of layer 4 is fed to reshape layer 1007 which adds padding to the output of layer 4 to compensate for the downsizing of layers 4 and 7 together. As a result, the dimensions of the images are greater than their original dimensions (that is, the pad width of the padding added by reshape layer 1007 is 2 pixels). The padded output is fed to layer 5 where processing continues up to layer 7, where, once again, the operation of layer 7 reduces the dimensions of the images to their original dimensions with a pad width of 1. At the end of processing by the modified DNN model, the processed images are extracted from the batched input by un-stitch layer 1009.

FIG. 11 illustrates in operational scenario 1100 a batching operation to employ batch-based DNN processing for a single input image in an implementation. In operational scenario 1100, feature map 1105 is representative of a vertically segmented image, such that segments of the image are represented as rows. For example, a DNN may receive an image from an input source. Pixel data from the image is loaded into a matrix, such as feature map 1105. In operation, rows of feature map 1105 are transferred to horizontal stacks to form batch 1110. Batch 1110 is representative of an acceptable input to a batch-based DNN. Batch 1110 includes padded rows of feature map 1105, implemented by a batch reshape layer of a batch-based DNN engine. In an implementation, rows of feature map 1105 are replicated in batch 1110 to match the capacity of the hardware. Upon determining an output, rows that were replicated in batch 1100 are removed.

FIG. 12 illustrates table 1200 which compares the results of processing images by a modified DNN-based inference model for four images processed individually and in a batch of four. As table 1200 shows, regardless of the network architecture, batch-based DNN processing results in faster processing rates, ranging from 41% to 90% faster throughput rates for batched processing over individual image processing. In addition, memory bandwidth (DDR BW) savings ranges from 10% to 66% for batched processing over individual image processing.

Turning now to FIG. 13, architecture 1300 illustrates computing device 1301 that is representative of any system or collection of systems in which the various processes, programs, services, and scenarios disclosed herein may be implemented. Examples of computing device 1301 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 1301 may be implemented as a single apparatus, system, or device or may be implemented in a distributed manner as multiple apparatuses, systems, or devices. Computing device 1301 includes, but is not limited to, processing system 1302, storage system 1303, software 1305, communication interface system 1307, and user interface system 1309 (optional). Processing system 1302 is operatively coupled with storage system 1303, communication interface system 1307, and user interface system 1309.

Processing system 1302 loads and executes software 1305 from storage system 1303. Software 1305 includes and implements process 1306, which is representative of the processes discussed with respect to the preceding Figures, such as process 200. When executed by processing system 1302, software 1305 directs processing system 1302 to operate as described herein for at least the various processes, operational scenarios, and sequences discussed in the foregoing implementations. Computing device 1301 may optionally include additional devices, features, or function not discussed for purposes of brevity.

Referring still to FIG. 13, processing system 1302 may comprise a micro-processor and other circuitry that retrieves and executes software 1305 from storage system 1303. Processing system 1302 may be implemented within a single processing device but may also be distributed across multiple processing devices or sub-systems that cooperate in executing program instructions. Examples of processing system 1302 include one or more general purpose central processing units, graphical processing units, microprocessors, digital signal processors, field-programmable gate arrays, application specific processors, processing circuitry, analog circuitry, digital circuitry, and logic devices, as well as any other type of processing device, combinations, or variations thereof.

Storage system 1303 may comprise any computer readable storage media readable by processing system 1302 and capable of storing software 1305. Storage system 1303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1303 may also include computer readable communication media over which at least some of software 1305 may be communicated internally or externally. Storage system 1303 may be implemented as a single storage device but may also be implemented across multiple storage devices or sub-systems co-located or distributed relative to each other. Storage system 1303 may comprise additional elements, such as a controller, capable of communicating with processing system 1302 or possibly other systems.

Software 1305 (including process 1306) may be implemented in program instructions and among other functions may, when executed by processing system 1302, direct processing system 1302 to operate as described with respect to the various operational scenarios, sequences, and processes illustrated herein. For example, software 1305 may include program instructions for implementing the processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1305 may include additional processes, programs, or components, such as operating system software, virtualization software, or other application software. Software 1305 may also comprise firmware or some other form of machine-readable processing instructions executable by processing system 1302.

In general, software 1305 may, when loaded into processing system 1302 and executed, transform a suitable apparatus, system, or device (of which computing device 1301 is representative) overall from a general-purpose computing system into a special-purpose computing system customized to support image processing. Indeed, encoding software 1305 on storage system 1303 may transform the physical structure of storage system 1303. The specific transformation of the physical structure may depend on various factors in different implementations of this description. Examples of such factors may include, but are not limited to, the technology used to implement the storage media of storage system 1303 and whether the computer-storage media are characterized as primary or secondary, etc.

For example, if the computer readable storage media are implemented as semiconductor-based memory, software 1305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1307 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The wireless data network circuitry described above comprises computer hardware and software that form special-purpose wireless system circuitry to serve wireless user devices based on policies. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless system circuitry to serve wireless user devices based on policies.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of executing an inference model by a processor, the method comprising:

by a stitching layer of the inference model:
   receiving multiple images;
   stitching together the multiple images to form a batch input; and
   supplying the batch input to a subsequent layer of the inference model; and by a reshape layer of the inference model:
   receiving an output produced by a previous layer of the inference model, wherein the output comprises multiple feature maps corresponding to the multiple images;
   inserting padding into the output, resulting in a padded output, including by inserting side padding between the multiple feature maps; and
   supplying the padded output as an input to a next layer of the inference model.

2. The method of claim 1 wherein the stitching layer comprises a layer at a beginning of the inference model, and wherein the inference model further includes an un-stitch layer that comprises a layer at an end of the inference model, and other layers positioned between the stitching layer and the un-stitch layer, and wherein the other layers include the subsequent layer, the previous layer, the reshape layer, and the next layer.

3. The method of claim 2 wherein inserting the padding into the output by the processor further comprises, at the reshape layer:

inserting top padding above each of the multiple feature maps;
inserting bottom padding below each of the multiple feature maps, wherein the bottom padding extends past a right side of a rightmost feature map; and
inserting additional side padding only to a left of a leftmost feature map of the multiple feature maps.

4. The method of claim 3 wherein executing the inference model by the processor further comprises, at the un-stitch layer:

receiving a second output from a penultimate layer of the inference model, wherein the second output comprises second feature maps corresponding to the multiple images; and
unstitching the second output to separate the second feature maps.

5. The method of claim 4 wherein the previous layer comprises a convolutional layer, and wherein the next layer comprises another convolutional layer.

6. The method of claim 5 wherein each image, of the multiple images, comprises one of: an entirely different image relative to each other of the multiple images, or a different portion of a single image.

7. The method of claim 2 wherein the inference model further includes a second reshape layer positioned between two layers of the inference model other than the previous layer and the next layer.

8. The method of claim 7 wherein executing the inference model by the processor further comprises, at the second reshape layer of the inference model:

receiving a second output produced by a previous one of the two layers, wherein the second output comprises second feature maps corresponding to the multiple images;
inserting second padding into the second output, resulting in a second padded output, including by inserting second side padding between the second feature maps; and supplying the second padded output as an input to a next one of the two layers.

9. A computing apparatus comprising:

one or more computer-readable storage media;

one or more processors operatively coupled with the one or more computer-readable storage media; and program instructions stored on the one or more computer-readable storage media that, when executed by the one or more processors, direct the computing apparatus to at least:

execute an inference model, wherein the inference model includes a stitching layer and a reshape layer, and wherein to execute the inference model, the program instructions direct the computing apparatus to:

at the stitching layer of the inference model:

receive multiple images;

stitch together the multiple images to form a batch input; and supply the batch input to a subsequent layer of the inference model; and at the reshape layer of the inference model:

receive an output produced by a previous layer of the inference model, wherein the output comprises multiple feature maps corresponding to the multiple images;

insert padding into the output, resulting in a padded output, wherein to insert the padding into the output, the program instructions direct the computing apparatus to insert side padding between the multiple feature maps; and supply the padded output as an input to a next layer of the inference model.

10. The computing apparatus of claim 9 wherein the stitching layer comprises a layer at a beginning of the inference model, wherein the inference model further includes an un-stitch layer that comprises a layer at an end of the inference model, and other layers positioned between the stitching layer and the un-stitch layer, and wherein the other layers include the subsequent layer, the previous layer, the reshape layer, and the next layer.

11. The computing apparatus of claim 10 wherein the program instructions further direct the computing apparatus to, at the reshape layer of the inference model:

insert top padding above each of the multiple feature maps;

insert bottom padding below each of the multiple feature maps, wherein the bottom padding extends past a right side of a rightmost feature map; and insert additional side padding only to a left of a leftmost feature map of the multiple feature maps.

12. The computing apparatus of claim 11 wherein the program instructions further direct the computing apparatus to, at the un-stitch layer of the inference model:

receive a second output from a penultimate layer of the inference model, wherein the second output comprises second feature maps corresponding to the multiple images; and unstitch the second output to separate the second feature maps.

13. The computing apparatus of claim 12 wherein the previous layer comprises a convolutional layer, and wherein the next layer comprises another convolutional layer.

14. The computing apparatus of claim 13 wherein each image, of the multiple images, comprises one of: an entirely different image relative to each other of the multiple images, or a different portion of a single image.

15. The computing apparatus of claim 10 wherein the inference model further includes a second reshape layer positioned between two layers of the inference model other than the previous layer and the next layer.

16. The computing apparatus of claim 15 wherein the program instructions further direct the computing apparatus to, at the second reshape layer of the inference model:

receive a second output produced by a previous one of the two layers, wherein the second output comprises second feature maps corresponding to the multiple images;

insert second padding into the second output, resulting in a second padded output, wherein to insert the second padding into the second output, the program instructions further direct the computing apparatus to insert second side padding between the second feature maps; and supply the second padded output as an input to a next one of the two layers.

17. A system comprising:

memory circuitry configured to store an inference model that includes a stitching layer and a reshape layer; and processing circuitry coupled with the memory circuitry and configured to execute the inference model;

wherein the stitching layer of the inference model, when executed by the processing circuitry, causes the processing circuitry to:

receive multiple images;

stitch together the multiple images to form a batch input; and supply the batch input to a subsequent layer of the inference model; and wherein the reshape layer of the inference model, when executed by the processing circuitry, causes the processing circuitry to:

receive an output produced by a previous layer of the inference model, wherein the output comprises multiple feature maps corresponding to the multiple images;

insert padding into the output, resulting in a padded output, wherein to insert the padding into the output, the reshape layer causes the processing circuitry to, when executed, insert side padding between the multiple feature maps; and supply the padded output as an input to a next layer of the inference model.

18. The system of claim 17 wherein the stitching layer comprises a layer at a beginning of the inference model, wherein the inference model further includes an un-stitch layer that comprises a layer at an end of the inference model, and other layers positioned between the stitching layer and the un-stitch layer, and wherein the other layers include the subsequent layer, the previous layer, the reshape layer, and the next layer.

19. The system of claim 18 wherein the reshape layer of the inference model, when executed by the processing circuitry, further causes the processing circuitry to:

insert top padding above each of the multiple feature maps;

insert bottom padding below each of the multiple feature maps, wherein the bottom padding extends past a right side of a rightmost feature map; and insert additional side padding only to a left of a leftmost feature map of the multiple feature maps.

20. The system of claim 19 wherein the un-stitch layer of the inference model, when executed by the processing circuitry, causes the processing circuitry to:

receive a second output from a penultimate layer of the inference model, wherein the second output comprises second feature maps corresponding the multiple images; and unstitch the second output to separate the second feature maps.

* * * * *